(12) United States Patent
Pfrenger

(10) Patent No.: US 8,876,026 B2
(45) Date of Patent: Nov. 4, 2014

(54) METHOD AND SYSTEM FOR ORIENTING SOLAR POWERED IRRIGATION SYSTEMS

(75) Inventor: Jochen Pfrenger, Omaha, NE (US)

(73) Assignee: Lindsay Corporation, Omaha, NE (US)

(*) Notice: Subject to any disclaimer, the term of this patent is extended or adjusted under 35 U.S.C. 154(b) by 517 days.

(21) Appl. No.: 13/267,187

(22) Filed: Oct. 6, 2011

(65) Prior Publication Data

US 2013/0087640 A1 Apr. 11, 2013

(51) Int. Cl.
| | |
|---|---|
| *B05B 3/00* | (2006.01) |
| *B05B 3/18* | (2006.01) |
| *A01G 25/09* | (2006.01) |
| *A01G 25/16* | (2006.01) |

(52) U.S. Cl.
CPC ............ *A01G 25/092* (2013.01); *A01G 25/165* (2013.01); *A01G 25/09* (2013.01)
USPC ............ 239/735; 239/723; 239/726; 239/728

(58) Field of Classification Search
CPC .... A01G 25/09; A01G 25/092; A01G 25/165
USPC .................... 239/723, 726, 728, 735
See application file for complete search history.

(56) References Cited

U.S. PATENT DOCUMENTS

| | | |
|---|---|---|
| 4,283,914 A | 8/1981 | Allen |
| 4,342,196 A | 8/1982 | Yeh |
| 4,372,114 A | 2/1983 | Burnham |
| 4,378,089 A | 3/1983 | Wilken et al. |
| 4,439,111 A | 3/1984 | Seidel et al. |
| 4,444,011 A | 4/1984 | Kolin |
| 4,522,338 A * | 6/1985 | Williams ................... 239/729 |
| 4,535,813 A | 8/1985 | Spain |
| 4,551,978 A | 11/1985 | O'Hare |
| 4,627,241 A | 12/1986 | Johnston |
| 4,666,376 A | 5/1987 | Solomon |
| 4,698,973 A | 10/1987 | Johnston |
| 4,720,978 A | 1/1988 | Spacer |
| 4,765,144 A | 8/1988 | Spacer |
| 4,980,574 A | 12/1990 | Cirrito |
| 5,160,214 A | 11/1992 | Sakurai et al. |
| 5,330,104 A | 7/1994 | Marcus |
| 6,068,197 A | 5/2000 | Tolson |
| 6,590,793 B1 | 7/2003 | Nagao et al. |
| 6,672,335 B1 | 1/2004 | Walborn |
| 6,709,198 B2 | 3/2004 | Wachtel |
| 6,889,922 B1 | 5/2005 | Knight et al. |
| 7,097,113 B2 | 8/2006 | Ivans |
| 7,878,429 B2 | 2/2011 | Parod et al. |
| 2005/0082390 A1 | 4/2005 | Ferrono et al. |
| 2005/0205698 A1 | 9/2005 | Knight et al. |
| 2006/0027677 A1* | 2/2006 | Abts ........................... 239/67 |
| 2006/0032938 A1 | 2/2006 | Pomey |
| 2007/0267524 A1* | 11/2007 | Mack ........................ 239/729 |
| 2009/0084615 A1* | 4/2009 | Parod et al. ................. 180/2.2 |
| 2010/0032495 A1* | 2/2010 | Abts ........................... 239/69 |

* cited by examiner

*Primary Examiner* — Ryan Reis
(74) *Attorney, Agent, or Firm* — Hovey Williams LLP

(57) ABSTRACT

An irrigation system includes a central pivot; a main section pivotally connected to the central pivot; and at least one solar panel supported on the main section. A control system positions the main section relative to the central pivot so that the solar panel faces the sun.

18 Claims, 5 Drawing Sheets

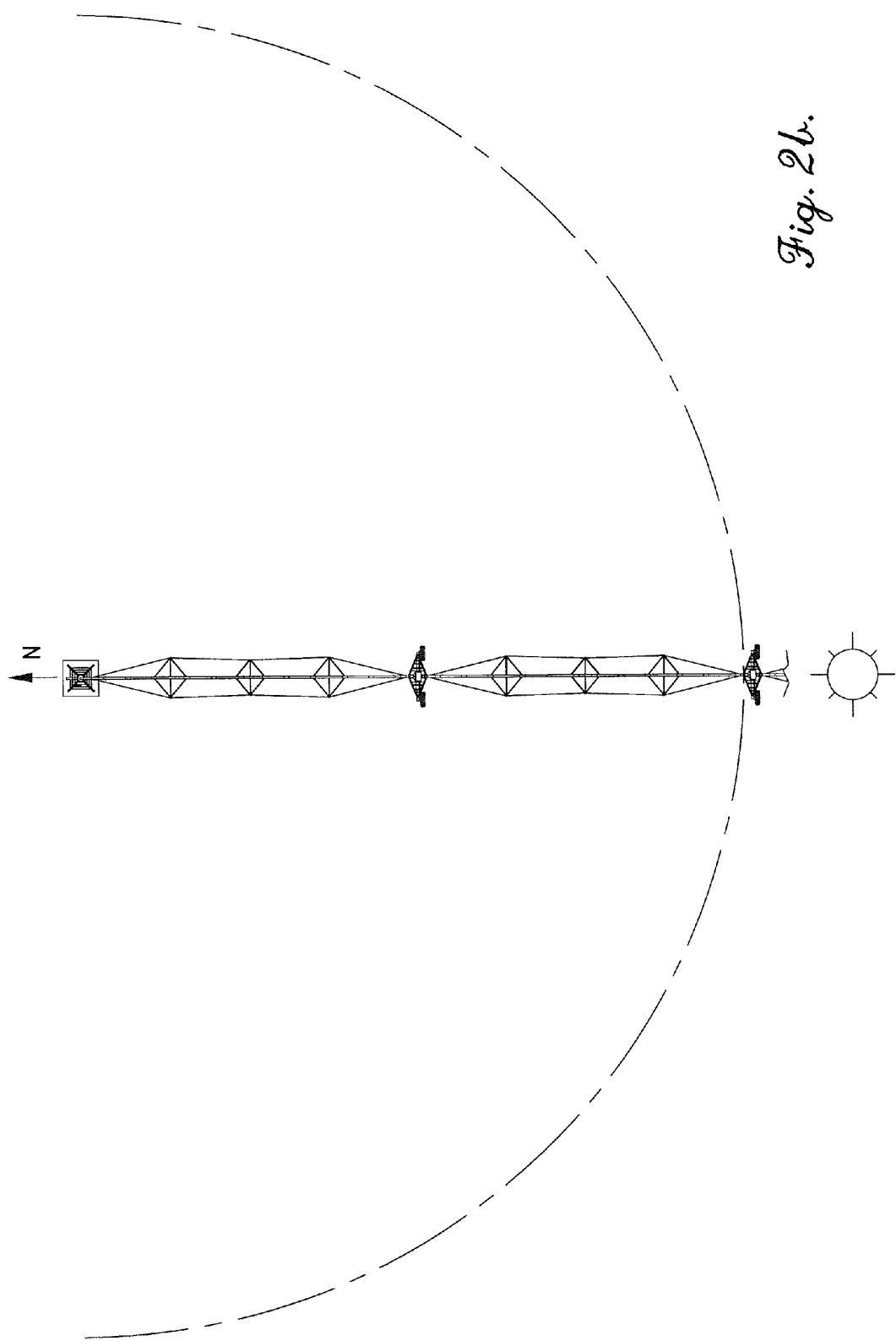

METHOD AND SYSTEM FOR ORIENTING SOLAR POWERED IRRIGATION SYSTEMS

BACKGROUND OF THE INVENTION

1. Field of the Invention

The present invention relates to agricultural irrigation systems. More particularly, the invention relates to a method and system for orienting a solar-powered irrigation system to permit optimal charging of the systems' batteries.

2. Background

Agricultural irrigation systems such as central pivot irrigation machines are commonly used to irrigate crops. A central pivot irrigation machine typically includes, among other things, a central pivot communicating with a pressurized water supply and a series of mobile support towers connected to the central pivot and to one another by truss-type framework sections. A water distribution conduit is supported by the framework sections and a number of sprinkler heads, spray guns, drop nozzles, or other fluid-emitting devices are spaced along the length of the conduit.

The mobile support towers are supported on wheels that are driven by a motor on each tower. Such an arrangement provides satisfactory performance, although it is expensive to provide power to all the motors because long power transmission devices, such as wires, cables, or the like, must extend out to the far reaches of the irrigation system.

Solar powered irrigation machines eliminate the need for power cabling to all the motors and provide other benefits. Such machines typically include a number of solar panels that collect light energy, convert the light energy to electrical energy, and use the electrical energy to power the drive motors on the mobile towers and/or charge batteries for later operation of the motors.

Solar panels produce the most electricity when they face the sun, thus, it is desirable to re-position the solar panels as the sun moves across the sky during the day. One such system for re-positioning the solar panels of an irrigation system is disclosed in U.S. Pat. No. 7,878,429 (the '429 patent), which is hereby incorporated into the present application in its entirety by reference. The '429 patent discloses an irrigation system with a direction control system and a tilt assembly for rotating and tilting its solar panels so the solar panels face the sun as the irrigation system moves across a field while in operation. While this approach is effective, it requires relatively expensive and complex equipment for mounting, rotating, and tilting the solar panels.

SUMMARY

Applicant has discovered that rotating and tilting solar panels to follow the sun is not always practical or required. Instead, Applicant has discovered that it is sometimes more economical to fixedly mount the solar panels to the irrigation system and then move the irrigation system and solar panels together so that the solar panels face the sun. Some loss of solar power charging is experienced with this approach when the irrigation system is in operation and facing away from the sun, but applicant has discovered that the temporary loss of charging is often more than offset by the efficiencies provided by the present invention.

An embodiment of the invention takes advantage of the above-described discoveries by providing an irrigation system comprising a central pivot; a main section pivotally connected to the central pivot; at least one solar panel supported on the main section; and a control system for positioning the main section relative to the central pivot so that the solar panel faces the sun.

The main section may comprise a series of mobile towers connected to the central pivot and to one another by truss-type frames or other support structure. A water conduit and water-emitting devices may be supported on the mobile towers. Each mobile tower has wheels and a motor for driving at least one of the wheels.

An embodiment of the control system comprises a timing device for determining or receiving a current date and time and a computing device for determining an optimal orientation of the main section and solar panel based on the current date and time and directing the motors to drive the wheels of the mobile towers to orient the main section in the optimal orientation. Generally, the optimal orientation is one that positions the main section and hence the solar panel to face the sun.

Another embodiment of the control system comprises a light detector for detecting the position of the sun in the sky and a computing device coupled with the light detector for determining an optimal orientation of the main section and directing the motors to drive the wheels of the mobile towers to orient the solar panel in the optimal orientation.

The principles of the present invention are not limited to central pivot irrigation systems and may be implemented in other types of solar-powered irrigation system including linear move irrigation systems.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 2b is a plan view showing another angular position or bearing of the irrigation system relative to North.

Figure 1:
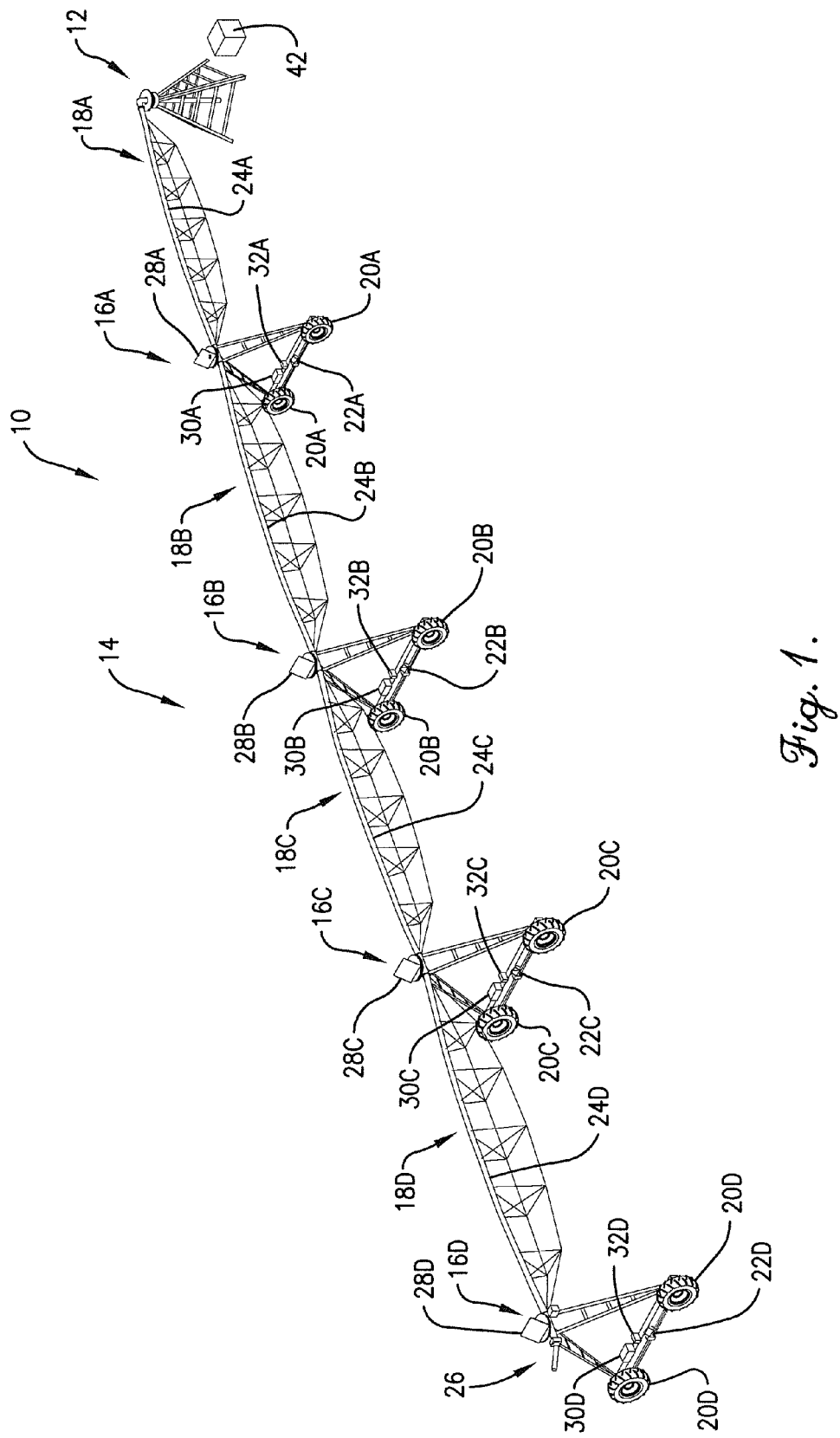
FIG. 1 is a perspective view of a solar powered central pivot irrigation system constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, an exemplary irrigation system 10 on which principles of the present invention may be implemented is illustrated. An embodiment of the irrigation system 10 is a central pivot irrigation system and broadly comprises a fixed central pivot 12 and a main section 14 pivotally connected to the central pivot. The irrigation system 10 may also comprise an extension arm (also commonly referred to as a "swing arm" or "corner arm") pivotally connected to the free end of the main section.

The fixed central pivot 12 may be a tower or any other support structure about which the main section 14 may pivot. The central pivot has access to a well, water tank, or other source of water and may also be coupled with a tank or other source of agricultural products to inject fertilizers, pesticides and/or other chemicals into the water for application during irrigation.

The main section 14 may comprise any number of mobile support towers 16A-D, the outermost of which is referred to herein as an end tower. The mobile support towers are connected to the fixed central pivot 12 and to one another by truss sections 18A-D or other supports.

The mobile support towers 16A-D have wheels 20A-D, at least one of which is driven by suitable reversible drive motors 22A-D. Each motor 22A-D turns at least one of its wheels 22A-D through a drive shaft to move its mobile support tower and thus the main section in a circle about the central pivot to irrigate a field. The operation of the motors is controlled by methods readily known in the art.

Although not required, some or all of the mobile support towers 16A-D may be equipped with steerable wheels pivoted about upright axes by suitable steering motors so that the towers can follow a predetermined track. U.S. Pat. No. 4,508,269 in the name of Davis et al. is hereby incorporated by reference in its entirety into the present specification for a disclosure of ground drive motors and steering motors associated with an irrigation machine. As is also well known, the drive motors for the towers are controlled by a suitable safety system such that they may be slowed or completely shut down in the event of the detection of an adverse circumstance, all of which is disclosed, for example, in U.S. Pat. No. 6,042,031 to Christensen, et al. incorporated herein by reference in its entirety.

Each of the truss sections 18A-D carries or otherwise supports a conduit section 24A-D or other fluid distribution mechanism that is connected in fluid communication with all other conduit sections. A plurality of sprinkler heads, spray guns, drop nozzles, or other fluid-emitting devices are spaced along the conduit sections to apply water and/or other fluids to land underneath the irrigation system.

The illustrated irrigation system 10 has four mobile support towers 16A-D. However, the main section 14 may comprise any number of mobile support towers, truss sections, wheels, and drive motors without departing from the scope of the present invention.

The irrigation system 10 may also include an optional extension aim (not shown) pivotally connected to the end tower 16D and may be supported by a swing tower with steerable wheels driven by a motor. The extension arm may be joined to the end tower by an articulating pivot joint. The extension arm is folded in relative to the end tower when it is not irrigating a corner of a field and may be pivoted outwardly away from the end tower while irrigating the corners of a field.

The irrigation system 10 may also include one or more high pressure sprayers or end guns 26 mounted to the end tower 16D or to the end of the extension arm. The end guns are activated at the corners of a field or other designated areas to increase the amount of land that can be irrigated.

In accordance with aspects of the present invention, the irrigation system 10 also comprises a number of solar panels 28A-D for collecting light energy from the sun and converting the light energy into electrical energy. Each solar panel has a collecting surface comprised of an array of photovoltaic cells that directly convert light energy into electrical energy. Any suitable solar array may be used without departing from the teachings of the present invention. One satisfactory solar panel is available from Kyocera Corporation, Solar Energy Division, of Kyoto, Japan.

The solar panels 28A-D may be mounted anywhere on the main section 14, and in one embodiment, are each mounted on top of one of the mobile towers 16A-D as depicted in FIG. 1. The solar panels may be fixedly mounted to the main section or may be mounted in such a way that permits them to be tilted as described in more detail below.

Each solar panel is in electrical communication with an electrical charge source 30A-D by wiring (not shown) or other suitable connection as known in the art. The electrical charge sources may be mounted to any part of the irrigation machine. In some embodiments, each electrical charge source comprises a rechargeable battery, although other conventional power supply elements, such as capacitors, direct wire conduits, receptacles, or fuel cells to receive the same could be used.

Each electrical charge source 30A-D is associated with one of the motors 22A-D to provide electrical power thereto via wiring (not shown) or other suitable connection as known in the art. Each electrical charge source, powered by electrical energy from its solar panel, could also provide power to other components of the irrigation system, such as a booster pump (not shown) or end gun, without departing from the teachings of the present invention. In the illustrated embodiments, each motor 22-D is associated with its own electrical charge source 30A-D and its own solar panel 28A-D, but one or more electrical charge sources and one or more solar panels would be connected to all of the motors without departing from the scope of the invention.

In some embodiments, each electrical charge source 30A-D is connected to a current inverter 32A-D and then to one of the motors 22A-D. The current inverters change direct current (DC) electricity supplied by the electrical charge source to alternating current (AC) electricity to power the motors. Alternatively, DC motors could be used instead of AC motors to eliminate the need for inverters.

The size, ratings, etc. of the solar panels 28A-D, motors 22A-D, and electrical charge sources 30A-D, and inverters 32A-D are selected based on the weights and other properties of the mobile towers. For example, relatively larger and/or more powerful solar panels, motors, etc. are generally needed for larger and heaver mobile towers.

The central pivot irrigation system 10 may also include a main control system for controlling movement of the mobile towers and operation of the fluid-emitting devices in accordance with an irrigation design program. The main control system may include a processor or other computing device with inputs that receive positional information from one or more GPS receivers mounted to the end tower or elsewhere. The processor may alternatively receive position information from angle encoders mounted between the central pivot and a first span of the main section. The processor may also include outputs connected to relay-controlled valves connected to the water-emitting devices and relay-controlled electric motors connected to the drive wheels of the mobile towers.

Figure 3:
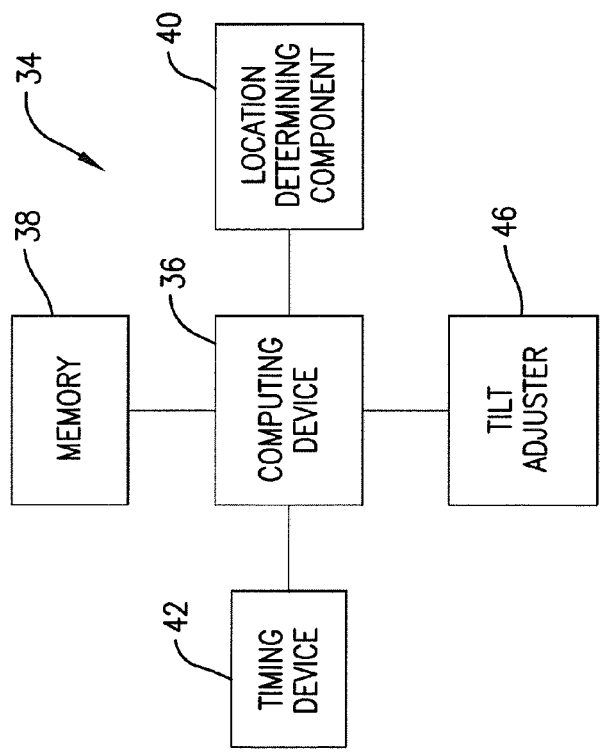
FIG. 3 is a block diagram of an embodiment of the control system of the irrigation system.

In accordance with aspects of the present invention, the irrigation system 10 also includes a control system 34 for controlling the positioning of the main section 14 and hence the solar panels 28A-D. The control system 34 can be implemented with hardware, software, firmware, or a combination thereof. One embodiment of the control system 34 is illustrated in FIG. 3 and comprises a computing device 36, memory 38, a location determining component 40, and a timing device 42. Some or all of the functionality of the control system 34 may be performed by the main control system, or vice versa. In other words, the main control system and the control system 34 may be separate systems or may be partially or fully integrated into a single control system.

The computing device 36 receives inputs from other components of the control system and determines optimal positions of the main section 14 and hence the solar panels 28A-D to maximize the solar charging of the batteries 30A-D as explained in more detail below. In one embodiment, the computing device 36 receives data from the location determining component 40 to determine the current position and/or angle of the main section 14, determines a desired position or angle of the main section and solar panels 28A-D, and then instructs the motors 22A-D to position the main section and solar panels to the desired position and/or angle. The computing device 36 may comprise or include any number of processors, controllers, ASICs, or other control circuitry. As mentioned above, the computing device and other components of the control system may be part of the main control system.

A computer program that may be implemented by the computing device 36 may perform some of the control functions described herein. The computer program preferably comprises an ordered listing of executable instructions for implementing logical functions in the computing device. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The memory 38 may be any electronic memory that can be accessed by the computing device and operable for storing instructions or data. The memory 38 may be integral with the computing device 36 or may be external memory accessible by the computing device. The memory may be a single component or may be a combination of components that provide the requisite functionality. The memory may include various types of volatile or non-volatile memory such as flash memory, optical discs, magnetic storage devices, SRAM, DRAM, or other memory devices capable of storing data and instructions. The memory may communicate directly with the computing device or may communicate over a bus or other mechanism that facilitates direct or indirect communication. The memory may optionally be structured with a file system to provide organized access to data existing thereon.

Figure 2A:
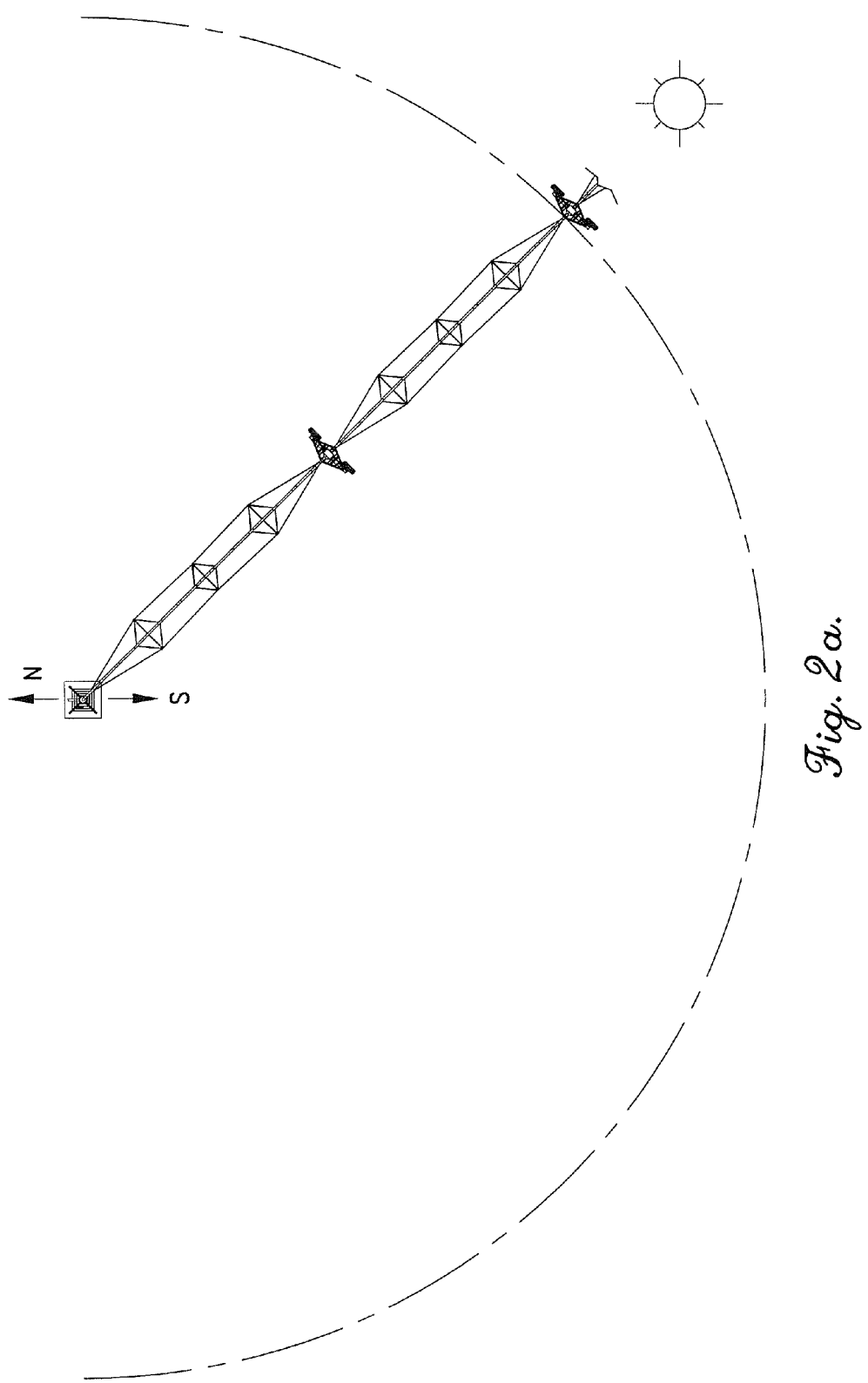
FIG. 2a is a plan view showing an angular position or bearing of the irrigation system relative to North.
Figure 2C:
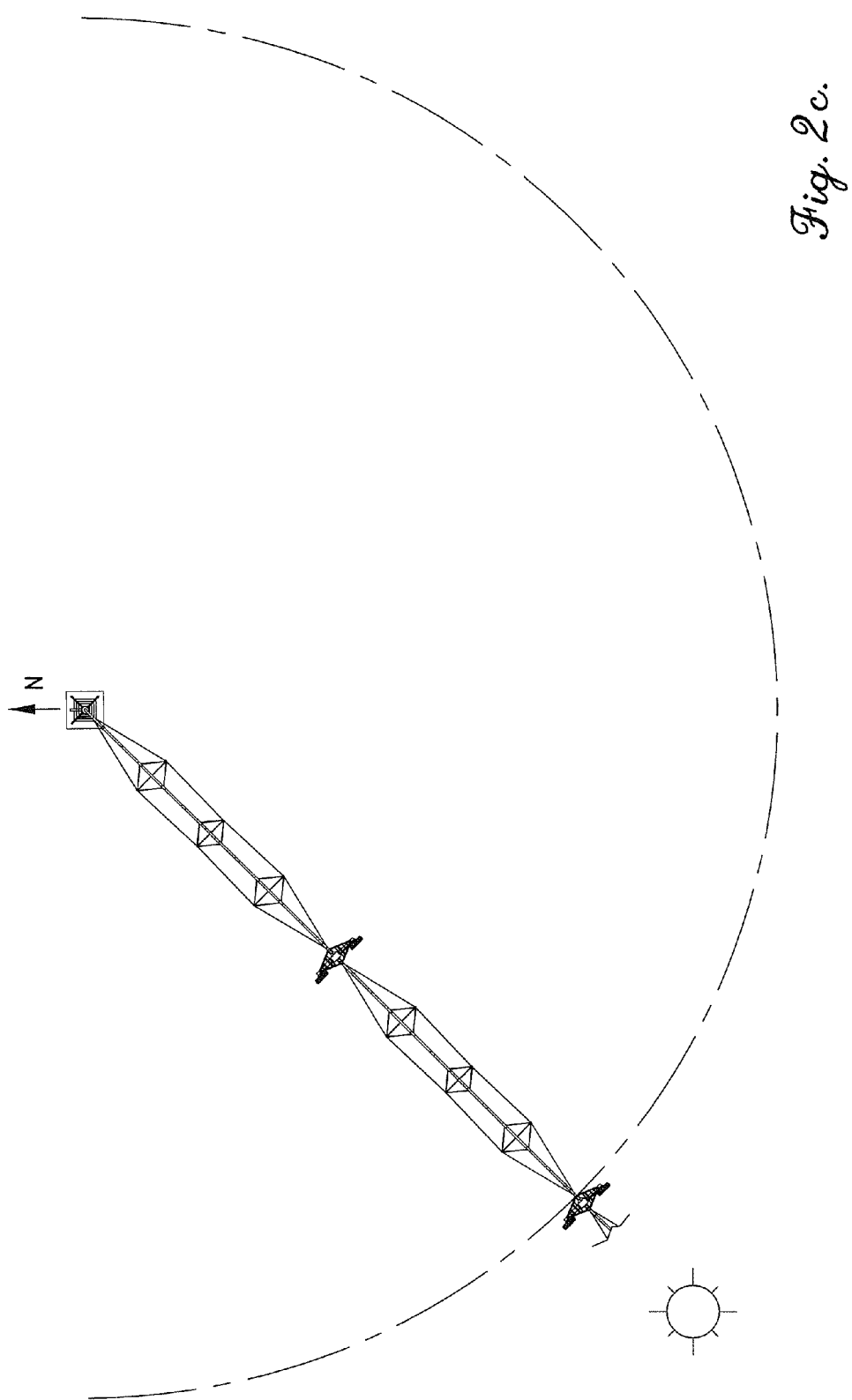
FIG. 2c is a plan view showing another angular position or bearing of the irrigation system relative to North.

In accordance with one important aspect of the invention, the memory 38 or other memory may store data representative of a plurality of desired angles or positions of the main section 14 for different dates and times. For example, the memory may store a look-up table that includes data representing the desired position/angle of the main section 14 for every hour of every day of the year. Generally, the desired positions and/or angles are those that orient the main section 14 and hence the solar panels 28A-D to face the sun as depicted in FIGS. 2a-c. Data representative of the position of the sun for every day and hour may be gathered from any available source such as almanacs and the like. Storing such data allows the computing device to determine the current day and time from the timing device 42 and to access the look-up table to find the ideal position and/or angle of the main section as a function of the current day and time as described below.

Note that FIGS. 2a-c depict an irrigation system with only two spans, although the invention is not limited to such an embodiment. Also note that the optimal orientation of the main section shown in FIGS. 2a-2c is based upon the mounting of the solar panels 28A-D shown in FIG. 1. If the solar panels were mounted to face a different direction relative to the main section, the optimal orientation of the main section would change as well. For example, if the solar panels were rotated 180° from where they are shown in FIG. 1, the optimal orientation of the main section would be facing 180° away from the sun so that the solar panels 28A-D would face the sun.

The location determining component 40 determines, in a substantially conventional manner, the current location or orientation of the main section 14. In one embodiment, the location or orientation information is determined or expressed as a bearing or angular displacement from a predetermined line of reference such as North. For example, referring to FIG. 2a, the main section's orientation may be determined or expressed as being 135° from North. Similarly, referring to FIG. 2b, the main section's orientation may be determined or expressed as being 180° from North. Finally, referring to FIG. 2c, the main section's orientation may be determined or expressed as being 225° from North.

The location determining component 40 may be any device capable of determining the main section's position or orientation. The location determining component may be, for example, an angle encoder positioned between the fixed central pivot 12 and the first span of the main section 14 for sensing an angle between a line extending through the length of the main section and an axis line such as North. In some embodiments, the angle encoder is incorporated in an existing articulating joint positioned between the central pivot 12 and the first span of the main section so that the control system does not require its own dedicated angle encoder.

The location determining component 40 may also be a GPS receiver attached to or near the end tower 16D and operable to receive navigational signals from GPS satellites to calculate a position of the end tower as a function of the signals. The computing device 36 then calculates an angle or bearing of the main section based on the position of the end tower and the fixed and known position of the central pivot. The GPS receiver may include one or more processors, controllers, or other computing devices and memory for storing information accessed and/or generated by the processors or other computing devices. In some embodiments, the GPS receiver is incorporated in the main control system so that the control system does not require its own dedicated GPS receiver. The GPS receiver may be coupled with a GPS patch antenna, helical antenna, or any other type of antenna mounted on or near the end tower.

The location determining component 40 may also be any other receiving device capable of receiving location information from at least three transmitting locations and performing basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

The timing device 42 may be any device that can determine or receive the current date and time. For example, the timing device may be a stand-alone clock or other device or may be an internal clock of the computing device 36. In one embodiment, the timing device is a radio-controlled clock that receives updated time and date information from a radio station or other source of such data. In another embodiment, the timing device is a receiver that merely receives updated time and date information from an external source.

The control system 34 may also include a display, inputs for receiving programs and data from external devices, a cellular or other radio transceiver for wirelessly receiving and transmitting data from and to remote devices, and/or other components.

Some or all of the components of the control system 36 may be enclosed in or supported on a weatherproof housing 42 for protection from moisture, vibration, and impact. The housing may be positioned anywhere such as near the central pivot 12 as illustrated in FIG. 1 and may be constructed from a suitable vibration- and impact-resistant material such as, for example, plastic, nylon, aluminum, or any combination thereof and may include one or more appropriate gaskets or seals to make it substantially waterproof or resistant.

The above-described components of the control system 34 need not be physically connected to one another since wireless communication among the various depicted components is permissible and intended to fall within the scope of the present invention.

In operation, the control system 34 monitors and controls the position and/or orientation of the main section 14 to ensure the solar panels 28A-D face the sun whenever the irrigation system is not being used to irrigate crops. The location-determining component 40 periodically or continuously determines the actual position or angular orientation of the main section 14. The computing device 36 then determines the desired position or angular orientation of the main section by determining the current date and time from the timing device 42 and then accessing the look-up table described above to determine the optimal position or angle of the main section for the current date and time. The computing device 36 then compares the main section's actual position or angle to the desired position or angle and drives the drive wheels in the appropriate direction until the main section's actual position or angle match the desired position or angle. The control system 34 may perform these steps nearly continuously so that the main section 14 precisely follows the sun in real-time or may perform the steps periodically (e.g. every hour) so as to avoid more frequent movement of the irrigation system 10.

Figure 4:
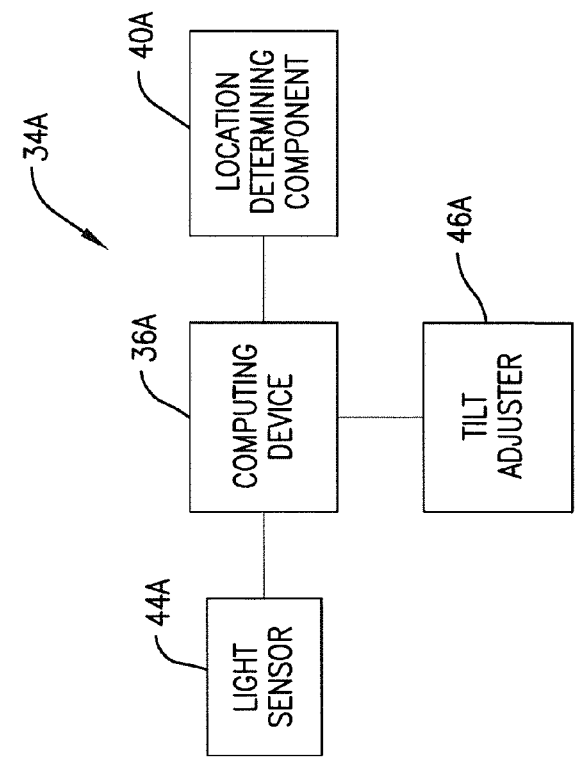
FIG. 4 is a block diagram of another embodiment of the control system.

A control system 34A constructed in accordance with another embodiment of the invention is illustrated in FIG. 4 and broadly comprises a computing device 36A, a location-determining component 40A, and a light sensor or detector 44A. The computing device 36A and location-determining component 40A are similar to the like-numbered components described above and are therefore not described again. The light detector 44A may be any device operable to detect a position of the sun in the sky and to generate a corresponding signal. For example, the light detector may be a radiation detector or similar device operable to detect an incident angle of maximum sunlight.

As with the embodiment of the control system 34 described above, the control system 34A monitors and controls the position and/or orientation of the main section 14 to ensure the solar panels 28A-D face the sun whenever the irrigation system 10 is not being used to irrigate crops. However, instead of consulting a look-up table to determine the optimal orientation of the main section and solar panels, the computing device 36A considers information from the light sensor 44A. Particularly, location-determining component 40A periodically or continuously determines the actual position or angular orientation of the main section 14. The computing device 36A then determines the desired position or angular orientation of the main section from the light detector 44A. The desired position or angular orientation is that which directs maximum sunlight on the solar panels. The computing device 36A then compares the main section's actual position or angle to the desired position or angle and drives the drive wheels 20A-D in the appropriate direction until the main section's actual position or angle match the desired position or angle. The control system 34A may perform these steps nearly continuously so that the main section precisely and follows the sun in real-time or may perform the steps periodically (e.g. every hour) so as to avoid more frequent movement of the irrigation system.

The control system 34 and/or 34A may also comprise a tilt adjustment mechanism 46, 46A for adjusting the tilt angles of the solar panels 28A-D to more precisely align them with the sun. Various different tilt adjustment mechanisms are described in more detail in the above-referenced '429 Patent.

Although the invention has been described with reference to the embodiments illustrated in the attached drawing figures, it is noted that equivalents may be employed and substitutions made herein without departing from the scope of the invention as recited in the claims. For example, the principles of the present invention are not limited to the illustrated central pivot irrigation systems but may be implemented in any type of solar-powered irrigation system including linear move irrigation systems.

Having thus described the preferred embodiment of the invention, what is claimed as new and desired to be protected by Letters Patent includes the following:

The invention claimed is:

1. An irrigation system comprising:
    a central pivot;
    a main section pivotally connected to the central pivot;
    at least one horizontally non-rotatable solar panel supported on the main section; and
    a control system configured to position the main section relative to the central pivot so that the at least one solar panel faces the sun whenever the irrigation system is not being used to irrigate the crops and to not position the main section relative to the central pivot so that the at least one solar panel faces the sun whenever the irrigation system is being used to irrigate the crops.

2. The irrigation system as set forth in claim 1, wherein the main section comprises:
    a series of mobile towers connected to the central pivot and to one another by support structure, each mobile tower having wheels and a motor for driving at least one of the wheels;
    a water distribution conduit supported by the support structure; and
    a number of fluid-emitting devices connected to the water distribution conduit.

3. The irrigation system as set forth in claim 2, wherein the control system comprises:
    a timing device for determining a current date and time; and
    a computing device configured to determine an optimal orientation of the solar panel based on the current date and time and configured to direct the motors to drive the wheels of the mobile towers to orient the solar panel in the optimal orientation.

4. The irrigation system as set forth in claim 2, wherein the control system comprises:
    a light detector for detecting a position of the sun; and
    a computing device coupled with the light detector, the computing device being configured to determine an optimal orientation of the solar panel based on an output of the light detector and being configured to direct the motors to drive the wheels of the mobile towers to orient the solar panel in the optimal orientation.

5. The irrigation system as set forth in claim 2, further comprising a main control system configured to control movement of the mobile towers and operation of the fluid-emitting devices in accordance with an irrigation control program.

6. The irrigation system as set forth in claim 5, wherein the control system is part of the main control system.

7. The irrigation system as set forth in claim 1, further comprising a tilt adjustor for adjusting a tilt angle of the solar panel.

8. The irrigation system as set forth in claim 7, wherein the tilt adjustor comprises an actuator for adjusting the tilt angle of the solar panel under direction of the control system.

9. An irrigation system comprising:
    a central pivot; and
    a main section pivotally connected to the central pivot, the main section comprising:
        a series of mobile towers connected to the central pivot and to one another by support structure, each mobile tower having wheels and a motor for driving at least one of the wheels;
        a water distribution conduit supported by the support structure;
        a number of fluid-emitting devices connected to the water distribution conduit;
        a plurality of horizontally non-rotatable solar panels supported on the main section;
    a timing device for determining or receiving a current date and time;
    a memory for storing data representative of a plurality of desired angles or positions of the main section for different dates and times; and
    a control system configured to:
        (a) determine the current angle or position of the main section;
        (b) determine an optimal orientation of the main section for the solar panels to face the sun based on the current date and time as determined by the timing device and a corresponding angle or position of the main section as stored on the memory; and
        (c) instruct the motors of the mobile towers to position the main section relative to the central pivot so that the solar panels face the sun,
        the control system being configured to perform steps (a)-(c) once per hour whenever the irrigation system is not being used to irrigate the crops and to not perform steps (b) and (c) whenever the irrigation system is being used to irrigate the crops.

10. An irrigation system comprising:
    a plurality of mobile towers;
    a water conduit supported by the towers;
    at least one horizontally non-rotatable solar panel supported on or near one of the mobile towers or the conduit; and
    a control system configured to position the mobile towers so that the at least one solar panel faces the sun whenever the irrigation system is not being used to irrigate the crops and to not position the mobile towers so that the at least one solar panel faces the sun whenever the irrigation system is being used to irrigate the crops.

11. The irrigation system as set forth in claim 10, wherein the control system comprises:
    a timing device for determining a current date and time; and
    a computing device configured to determine an optimal orientation of the solar panel based on the current date and time and configured to direct motors to drive wheels of the mobile towers to orient the solar panel in the optimal orientation.

12. The irrigation system as set forth in claim 10, wherein the control system comprises:
    a light detector for detecting a position of the sun; and
    a computing device coupled with the light detector, the computing device being configured to determine an optimal orientation of the solar panel based on an output of the light detector and being configured to direct motors to drive wheels of the mobile towers to orient the solar panel in the optimal orientation.

13. The irrigation system as set forth in claim 10, further comprising a main control system configured to control movement of the mobile towers in accordance with an irrigation control program.

14. The irrigation system as set forth in claim 13, wherein the control system is part of the main control system.

15. The irrigation system as set forth in claim 10, further comprising a tilt adjustor for adjusting a tilt angle of the solar panel.

16. The irrigation system as set forth in claim 15, wherein the tilt adjustor comprises an actuator for adjusting the tilt angle of the solar panel under direction of the control system.

17. The irrigation system as set forth in claim 10, wherein the at least one horizontally non-rotatable solar panel faces horizontally perpendicular to the main section.

18. The irrigation system as set forth in claim 10, wherein the at least one horizontally non-rotatable solar panel faces horizontally in line with the main section.

* * * * *